United States Patent
Dialer et al.

(10) Patent No.: US 7,776,288 B2
(45) Date of Patent: Aug. 17, 2010

(54) CHARGING DEVICE FOR A TUBULAR REACTOR

(75) Inventors: Harald Dialer, Munich (DE); Michael Hoffman, Bejing (CN)

(73) Assignee: Süd-Chemie AG, München (DE)

( * ) Notice: Subject to any disclaimer, the term of this patent is extended or adjusted under 35 U.S.C. 154(b) by 705 days.

(21) Appl. No.: 11/686,383

(22) Filed: Mar. 15, 2007

(65) Prior Publication Data

US 2007/0224095 A1    Sep. 27, 2007

(30) Foreign Application Priority Data

Mar. 23, 2006   (DE) ...................... 10 2006 013 488

(51) Int. Cl.
*B01J 8/06* (2006.01)
*B01J 8/00* (2006.01)

(52) U.S. Cl. ...................................... 422/219; 422/232

(58) Field of Classification Search ................ 422/196, 422/197, 213, 214, 219, 232; 141/100, 105; 414/415, 425, 589

See application file for complete search history.

(56) References Cited

U.S. PATENT DOCUMENTS

| | | | |
|---|---|---|---|
| 2,070,868 A | 2/1937 | Smith | |
| 3,913,806 A | 10/1975 | Red, Jr. | |
| 4,402,643 A | 9/1983 | Lytton | |
| 4,441,532 A * | 4/1984 | Hrubesh | 141/1 |
| 4,461,327 A | 7/1984 | Magin | |
| 4,650,647 A * | 3/1987 | Kito et al. | 422/169 |
| 5,890,868 A | 4/1999 | Comardo | |
| 5,897,282 A | 4/1999 | Comardo | |
| 6,032,828 A | 3/2000 | Gicza | |
| 6,132,157 A * | 10/2000 | Comardo | 414/160 |
| 6,694,802 B1 | 2/2004 | Comardo | |
| 6,966,453 B2 * | 11/2005 | Tian | 221/200 |
| 6,981,422 B1 | 1/2006 | Comardo | |
| 6,981,529 B2 * | 1/2006 | Fry | 141/67 |
| 7,132,088 B2 * | 11/2006 | Smid et al. | 422/176 |
| 7,198,767 B1 * | 4/2007 | Grochowski | 423/213.2 |
| 7,381,271 B2 * | 6/2008 | Farmwald et al. | 118/303 |
| 7,497,985 B2 * | 3/2009 | Fuchs | 266/177 |
| 2008/0292441 A1 * | 11/2008 | Zahirovic | 414/680 |

FOREIGN PATENT DOCUMENTS

| | | |
|---|---|---|
| DE | 2613310 | 10/1977 |
| DE | 3935636 A1 | 5/1991 |
| DE | 19934324 | 9/2000 |
| EP | 0311712 A1 | 4/1989 |
| WO | WO9308907 A1 | 5/1993 |
| WO | WO9802238 * | 1/1998 |
| WO | WO2005118125 A1 | 12/2005 |

\* cited by examiner

*Primary Examiner*—Walter D Griffin
*Assistant Examiner*—Christopher K VanDeusen
(74) *Attorney, Agent, or Firm*—Scott R. Cox

(57) ABSTRACT

A charging device for a tubular reactor has metering chambers which can be filled with filling material, such as, for example, catalytically coated carrier material, it being possible for a respective tube of the tubular reactor to be filled via a feed device which adjoins the metering chamber. The metering chamber has a sloping surface and an opposing surface for supporting the filling material, which run at an angle to one another.

21 Claims, 2 Drawing Sheets

CHARGING DEVICE FOR A TUBULAR REACTOR

Figure 1:
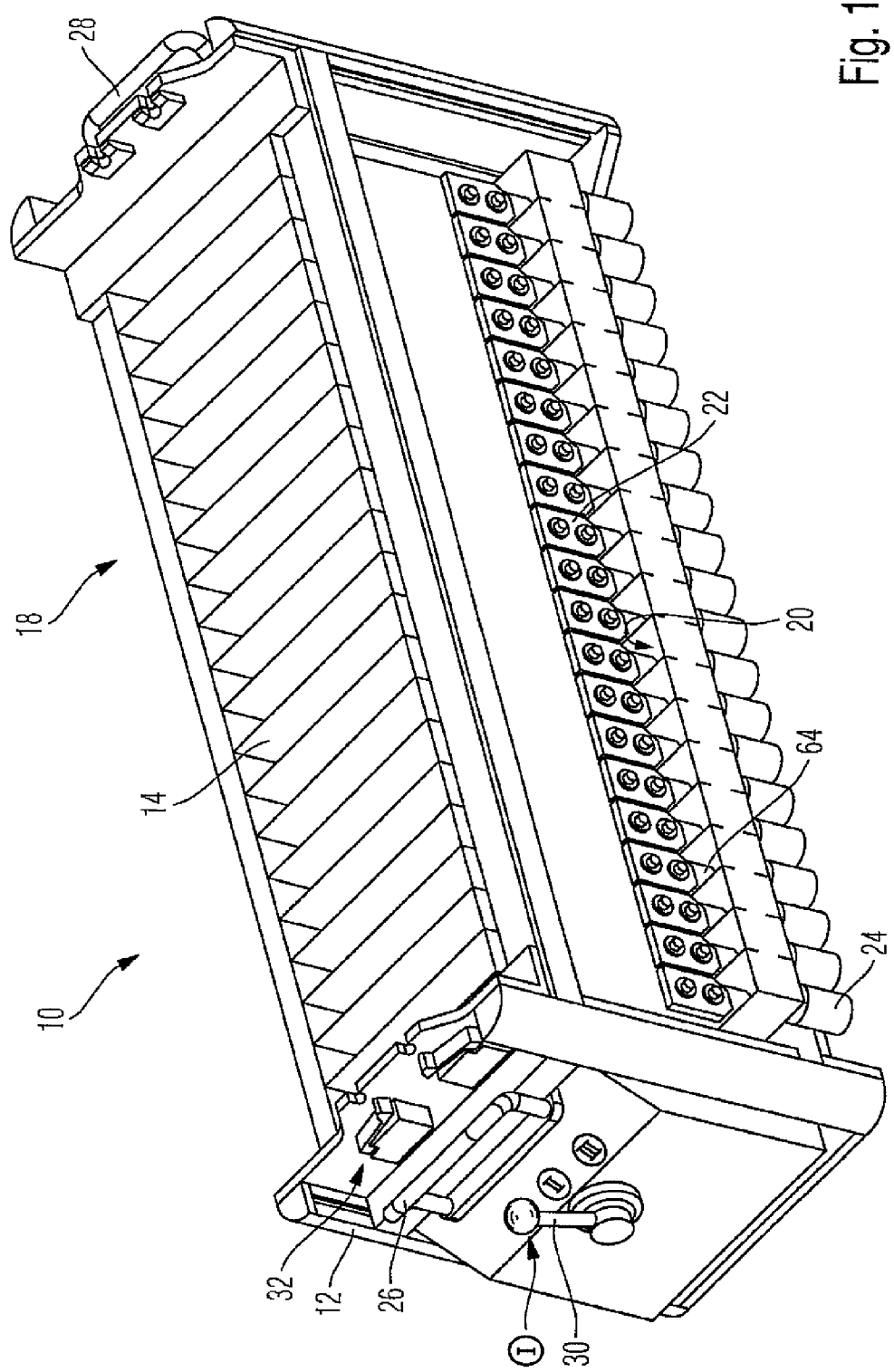

The invention relates to a charging device for tubular reactors according to the preamble of claim 1.

The filling of the tubes of tubular reactors regularly requires the introduction of granular solids. It has been known for a long time that mechanical assistance for the filling would be desirable in view of the multiplicity of tubes extending in parallel. An example of a tubular reactor can already be seen from U.S. Pat. No. 2,070,868. The flow velocity of the parallel tubes which is as uniform as possible is already mentioned in this publication. In order to obtain an acceptable reaction result, filling should be carried out as uniformly as possible. In order to achieve this, subsequent work must often be carried out manually in the case of automatic filling (cf., e.g., U.S. Pat. No. 3,913,806). If possible, a bridge formation should be avoided; comparatively slow and careful pouring-in is desirable.

In the last decade, however, large tubular reactors having, for example, 20,000 or 40,000 tubes have been completely realized. It has to be expected that a significant amount of time will be needed during the careful manual pouring-in. Also, since the space above the reactor is limited, not just any desired number of operators can work at the same time. In any case, the manual filling of a reactor is extremely time-consuming. In addition to the labor costs, the user has to expect expensive downtimes for the filling.

Numerous tests to automate the filling have therefore been carried out. In order to ensure that the same filling quantity is poured into each tube, balances have been used, reference being made by way of example to DE-A1 30 20 845. With this solution, a metering-type belt weigher is used in order to ensure that there are identical filling quantities at the tubes.

However, on account of the granular consistency of the filling material, which is usually a catalytically coated carrier material, problems also arise with such a solution, which is already quite complicated. The individual filling material particles are taken up by one another, so that uneven fillings occur.

Tubular reactors often require different filling materials or catalysts to be introduced into the tube or the nest of tubes. These different filling materials have partly different consistencies, but in any case regularly have a different filling quantity. Here, it is then important that not only the entire tube of the tubular reactor is filled to the correct filling height and compaction, but that the relevant filling material is present in the respectively desired quantity in each tube. For example, three or four different filling materials must often be introduced one after the other.

In order nonetheless to be able to ensure the appropriate filling heights, it has been proposed to carry out only a partial filling of the respective metering chambers. In the case of partial fillings, however, the filling height of the metering chambers themselves can only be controlled with difficulty.

A further proposed possibility consists in working with very small metering chambers and in carrying out multiple fillings. If, for example, the three filling materials are to be poured into the tubes of the tubular reactor in the ratio 3:5:1, first of all the relevant metering chamber is filled and emptied three times with the first material, then five times with the second material and then once with the third material. However, this method is extremely time-consuming, in a similar manner to the manual filling, so that it has not gained acceptance.

Furthermore, it has also already been proposed to charge the metering chambers themselves with pre-proportioned filling material quantities. In this case, catalysts have to be pre-packed for every tube and every catalyst layer. This requires a comparatively expensive packing machine, but the charging itself is nonetheless very expensive and slow and is at the same time susceptible to operating errors.

Furthermore, a metering carriage movable on a rail has been disclosed by U.S. Pat. No. 5,890,868, this metering carriage carrying out the corresponding metering after filling from a storage container. The individual chambers of the metering carriage are filled via a pivotably suspended slide which can be actuated by a pneumatic cylinder, the intention being to compensate for the varying height by means of a height adjustment of the infeed funnel. This solution is basically not very suitable for multiple filling of tubes, in particular if different heights per filling material are to be realized.

In addition, in the case of such a charging device, a varying degree of compaction occurs in the individual tubes of the tubular reactor, since the filling material particles, when dropping into the tubes, tend to be taken up by one another in a varying manner. Accordingly, the resistance to flow likewise varies, which leads to varying reaction times occurring due to the varying differential pressure loss in the individual tubes of the tubular reactor. The yield and the quality of the reaction products manufactured thus drop markedly.

In order to prevent this, subsequent manual work is normally necessary, which requires at least as much time as that for the manual filling, or the poor quality and yield of the reaction product is tolerated.

Furthermore, it has already been proposed to provide the metering chamber unit with discharge lips which on the one hand serve to hold back the filling material in the metering chambers but on the other hand serve to charge the tubular reactors, which may be effected via drop tubes. Certain singulation can certainly be achieved via such discharge lips. However, the varying consistency of the filling materials used requires the discharge lip to be made adjustable, so that the same singulation effect is achieved with coarser filling material as with finer filling material.

However, the granularity, that is to say the structure of the filling material deviating from the spherical shape, makes the adjustability more difficult, and which position of the discharge lip suits which filling material has to be determined in a series of tests. In order to make the delivery via the discharge lip more uniform, a vibrator, which improves the discharge behavior of the discharge lip somewhat, may also be provided in the proposed configuration. Nonetheless, the uniformity of the delivery is still not quite satisfactory even with the vibrator.

The object of the invention is therefore to provide a charging device for tubular reactors according to the preamble of claim 1 which permits uniform charging of the tubes of the tubular reactors even in the case of different filling materials.

This object is achieved according to the invention by claim 1. Advantageous developments follow from the subclaims.

The charging device according to the invention for tubular reactors has a metering chamber, the base of which is designed as a sloping surface. A gap is formed via an opposing surface, and this gap extends above the sloping surface, preferably approximately in the center. According to the invention, an especially favorable aspect of this design of a central gap is the relief of the discharge lip, which may be provided on the outlet side of the metering chamber. In addition to the singulation realized by the metering chamber in any desired manner, preliminary singulation, which substantially increases the efficiency of the entire singulation, thus occurs via the central gap.

Surprisingly, this measure can be used especially effectively for making the delivery more uniform even in the case of filling material of varying lumpiness. This all the more so if the base of the metering chamber is provided with a vibrator and the impingement point of the poured filling material, which rests on the opposing surface and slides toward the sloping surface, is provided approximately in the region of the coupling of the vibrator. The vibrator can then be arranged opposite the gap at the location of the greatest vibratory amplitude, an offset by, for example, 10, 20 or 30% of the extent of the sloping surface—as viewed in the projection from the side—being easily realizable. In practice, the gap is then rhythmically constricted and enlarged by the measure according to the invention, a factor which obviously serves for the especially effective preliminary singulation.

Even if another singulation device such as a volumetric conveyor, a cellular wheel sluice or the like is used instead of the discharge lip, a marked improvement in the overall singulation capacity and in making the delivery more uniform can be achieved. The tendency to become clogged is substantially improved in such a case, and the lumpy material flows virtually into a layer of defined height, the layer height, according to the invention, being essentially the same preferably over the bottom region of the sloping surface of the metering chamber. This permits a type of controlled banking-up for the filling material according to the invention, which on the one hand drastically reduces, for example by more than a power of ten, the weight bearing on the discharge lip or another delivery device of the metering chamber, but on the other hand ensures uninterruptible delivery even in the case of very large granular filling materials that are difficult to pass through.

In addition, due to the improved singulation, a bridge formation during the filling of the reaction tube can be avoided and thus a greater degree of compaction can be achieved. The particle singulation improved during the filling permits homogenous filling of the tubes and makes possible a higher filling rate.

According to the invention, due to the gap provided approximately in the center of the sloping surface, momentum emptying of the metering chamber can be reliably avoided. Such momentum emptying can be observed in the case of discharge lips which are loaded by the entire filling weight of the metering chamber and are designed or set so as to be comparatively yielding. During momentum emptying, the discharge lip opens by lateral deflection and the outflowing material then entrains the subsequently flowing material, so that substantially more material flows out than is intended. This can be reliably avoided by the preliminary singulation according to the invention.

The discharge lip provided in an advantageous configuration can be provided like an apron on the outlet side of the metering chamber and can be laterally deflected by the filling material delivered there. The shearing effect produced by this between the vibratory base and the discharge lip is desired, in addition to the shearing effect which is produced at the gap according to the invention.

Markedly more uniform filling of the reactor tubes is surprisingly obtained with the charging device according to the invention. The subsequent manual work is virtually no longer necessary, even if high demands are imposed on the uniformity of the filling and thus on the quality and yield of the reaction product. In particular the dwell time of the feedstock between the tubes is made more uniform in the case of high-load reactors, so that the feedstock can even be run within the explosion range.

According to the invention, it is especially favorable that, in multi-layer catalyst systems, the activities of the individual catalyst layers can be adapted to the course of the reaction along the reactor axis. As a result, it is possible to achieve a high end-product yield and at the same time as small a formation of undesirable intermediate products as possible.

The invention is not restricted to the use of certain filling materials. The filling material particles may be designed, for example, in the form of rings, spheres, pellets, perforated pellets, trilobes, perforated trilobes, star-shaped strands, star-shaped pellets, cart wheels, extrudates, pills or cylinders or granular material, it being possible to use both solid catalyst material and catalytically coated carrier material. In the case of catalytically coated carrier material, the carrier material preferred is, for example, silicon carbide or steatite, but quartz, porcelain, $SiO_2$, $Al_2O_3$ are also suitable.

Various end products can be manufactured with such tubular reactors, for example phthalmic anhydride, maleic anhydride, formaldehyde, acrolein, acrylic acid, methacrylic acid, acrylonitrile, glyoxal, ethylene oxide, vinyl chloride, vinyl acetate, oxo alcohol, styrene. The tubular reactor can also be used for selective hydrogenation of alkines and dienes, e.g. in olefinic flows.

Figure 2:
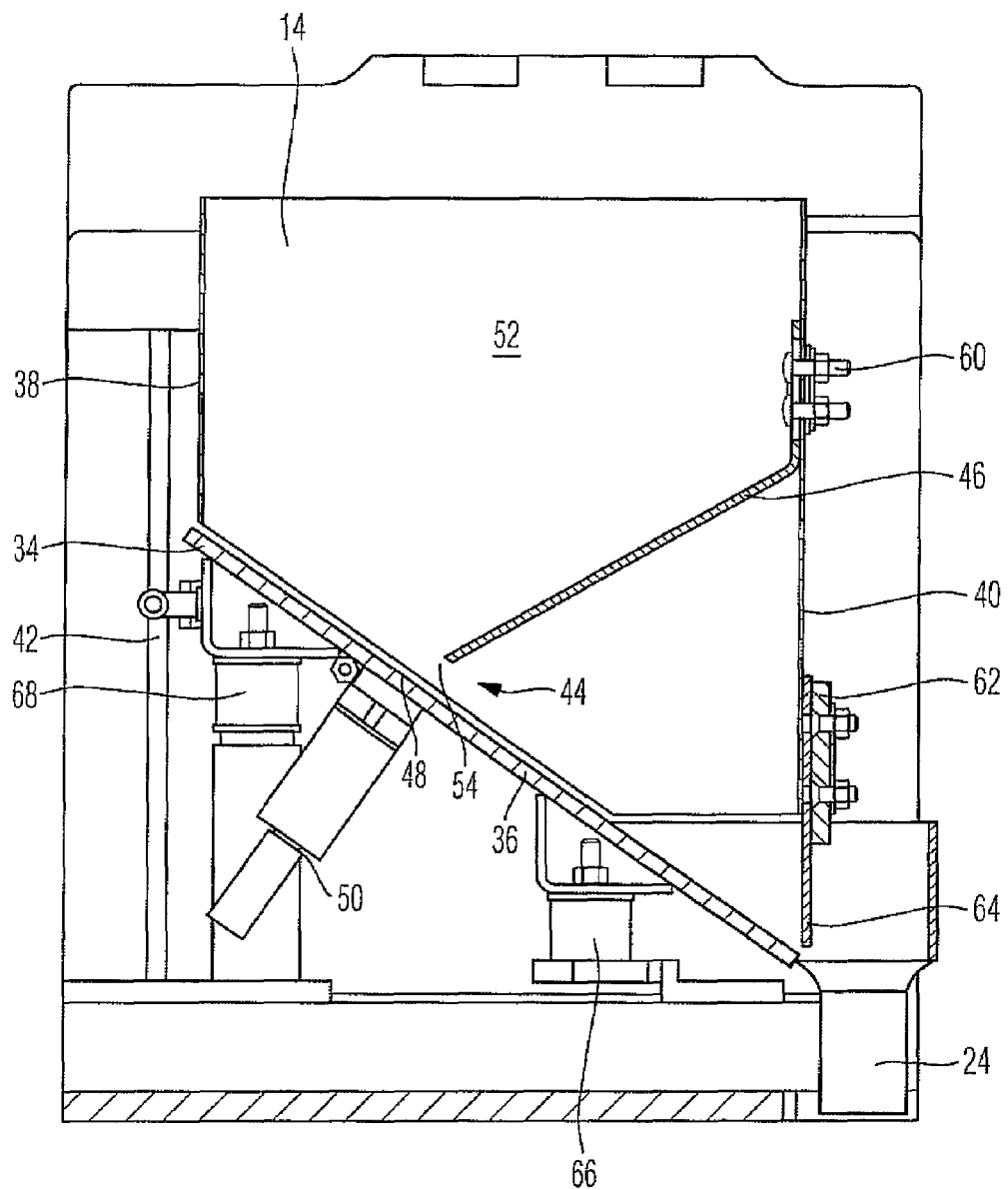

Further details, advantages and features follow from the description below of an exemplary embodiment of the invention with reference to the drawings, in which:

FIG. 1 shows a perspective illustration of part of a metering device according to the invention, namely a metering chamber unit; and FIG. 2 shows a schematic section through an embodiment of a charging device according to the invention.

The charging device 10 shown in FIG. 1 has a frame 12 which comprises a multiplicity of metering chambers 14 which are combined to form a metering chamber unit 18. Provided on the outlet side of the metering chambers 14 are the down tubes 24, which are intended to end above tubes of a tubular reactor. The down tubes 24 accordingly have a slightly smaller diameter than the tubes of the tubular reactor.

The metering chambers 14 have a width which corresponds essentially to that of a down tube. In the example, 20 metering chambers 14 are provided side by side, and it goes without saying that this number can be adapted to the requirements within wide ranges. On the outlet side, each metering chamber has a discharge lip 64, which projects like an apron into an outlet passage 20 of the metering chamber. Each discharge lip 64 is adjustably mounted in the outlet passage 20 via a retaining plate 22.

At its end faces, the metering chamber unit 18 has a respective handle 26 and 28, via which, for example, it can be put onto the top side of the tubular reactor. Furthermore, a selector lever 30 is provided, which is part of a selector device via which the filling material to be used here can be selected. The selector lever has three positions I, II and III. It goes without saying that more than or fewer than three layers of the filling material or corresponding positions are readily possible instead. It acts in conjunction with a code 32 when mounting the pre-chamber unit. Here, the code 32 is represented via microswitches, and it goes without saying that any other desired code is possible.

It can be seen from FIG. 2 that the metering chamber 14 has a sloping surface 36 at its base 34 provided for receiving the filling material, said sloping surface 36, in the exemplary embodiment shown, extending over the entire width of the metering chamber 14, that is to say from one side wall 38 up to an opposite side wall 40.

In the exemplary embodiment shown, the sloping surface is arranged at an angle of about 35° to the horizontal. However, the angle of inclination of the sloping surface 36 can be adapted to the requirements within wide ranges via an adjusting device 42.

The sloping surface 36 receives the filling material and supports it from below. Approximately halfway up said sloping surface 36, preferably slightly above this point, a gap 44 is provided which is formed between the sloping surface 36 and the opposing surface 46 according to the invention. The gap 44 extends in the drawing direction between the bottom end of the opposing surface 46 and the sloping surface 36. In this respect, an impingement point is formed on the sloping surface 36 by the extension of the opposing surface 46. Provided in the vicinity of this impingement point is a coupling 48 of a vibrator 50, which in this respect can set the sloping surface 36 in vibratory movements or vibrations via the coupling 48.

The embodiment shown here by way of example enables filling material to be received in a storage region 52 which is formed above both the opposing surface 46 and the sloping surface 36 and ends at the bottom in the gap 44. The main weight of the filling material is absorbed there and is largely supported by the opposing surface 46, since the latter extends over slightly more than half the width of the metering chamber, for example over 55 to 60% of the width.

In this respect, the sloping surface 36 is relieved to a great extent, and preliminary singulation occurs in the region of its main vibration amplitude at the gap 44 adjacent to the impingement point 54.

To this end, the opposing surface 46, which is connected to the side wall 40 via screw bolts 60, can be adjusted in its height. A higher adjustment enlarges the gap 44, whereas a lowered adjustment reduces the gap 44.

According to the invention, the discharge lip 64 is suspended at the bottom end of the side wall 40, adjustment also being realizable here via an adjustable suspension device 62. The discharge lip 64 is made of rubber or another elastomer and hangs down flexibly to a point just above the bottom end of the sloping surface 36. This results in the possibility of subsequent singulation of the lumpy filling material.

The filling material is in this respect first of all pre-singulated at the gap 44 and subsequently singulated by the action of the discharge lip 64 relative to the sloping surface 36 before it can enter the down tube 24.

The sloping surface 36 is mounted via elastic blocks 66, 68. The mounting is effected at a marked distance from the impingement point 54 and the coupling 48 of the vibrator 50. This ensures lighter vibration and a corresponding deflection of the sloping surface 36, the elastic blocks 66 and 68 having a damping effect on any possible undesirable sympathetic vibrations.

The charging device according to the invention enables up to 2,000 tubes per hour to be filled, so that even a large tubular reactor can be filled in one to two days and the plant downtime required during manual filling can be reduced from, for example, four weeks to one day.

The invention claimed is:

1. A charging device for filling a tube of a tubular reactor, comprising metering chambers, which can be filled with filling material, such as, for example, catalytically coated carrier material, wherein at least one of the metering chambers comprises a sloping surface and an opposing surface for supporting the filling material, which surfaces run at an angle to one another, wherein the opposing surface extends with an inclination in an opposite direction to an inclination of the sloping surface; wherein the metering chambers further comprise a gap for the passage of the filling material, which gap extends between the sloping surface and the opposing surface and is located approximately at half height of the sloping surface, wherein a storage region is formed above both the sloping surface and the opposing surface, the storage region ending at a bottom in the gap; wherein the metering chamber comprises a metering outlet which is formed between a discharge lip and the base of the metering chamber, the discharge lip being fastened to the metering chamber and hanging down flexibly to a point above the bottom end of the sloping surface, and wherein the sloping surface is connected to a vibrator via which it can be set at least partly in vibratory movements such that the gap may be rhythmically constricted and enlarged.

2. The charging device as claimed in claim 1, wherein the inclination of the sloping surface is adjustable.

3. The charging device as claimed in claim 1, wherein a height and/or the inclination of the opposing surface is adjustable.

4. The charging device as claimed in claim 1, wherein the opposing surface extends at least partly above the sloping surface, and in vertical projection, the opposing surface at least predominantly overlaps the sloping surface.

5. The charging device as claimed in claim 1, wherein the opposing surface together with the sloping surface forms essentially the shape of a y, but with the gap left between the between the two surfaces.

6. The charging device as claimed in claim 1, wherein the sloping surface extends over part of a base of the metering chamber.

7. The charging device as claimed in claim 6, wherein the sloping surface extends over the entire base of the metering chamber.

8. The charging device as claimed in claim 1, further comprising a pre-chamber, via which the metering chamber can be charged, is arranged above the metering chamber.

9. The charging device as claimed in claim 8, wherein a slide is provided between the pre-chamber and the metering chamber and by the actuation of which slide, filling material can be transferred from the pre-chamber into the metering chamber.

10. The charging device as claimed in claim 1, wherein the discharge lip is suspended like an apron at the metering outlet for each metering chamber.

11. The charging device as claimed in claim 10, wherein the discharge lip is mounted on the metering chamber in such a way as to be adjustable in its vertical position and is flexible, in which case it ends between 1 mm and 4 cm, above the base of the metering chamber.

12. The charging device as claimed in claim 1, wherein the metering chamber is of funnel-shaped design, wherein the sloping surface has an angle of inclination of 15° to 60° relative to the horizontal.

13. The charging device as claimed in claim 12, wherein the opposing surface has an angle of inclination which corresponds essentially to the angle of inclination of the sloping surface and is 15° to 60° relative to the horizontal.

14. The charging device as claimed in claim 1, wherein the width of the gap between the sloping surface and the opposing surface is adjustable.

15. The charging device as claimed in claim 1, wherein the vibrator is connected to the sloping surface approximately in the center, as viewed in lateral projection, and wherein an extension of the opposing surface toward the sloping surface forms an impingement point, and wherein the vibrator is connected to the sloping surface essentially at the impingement point.

16. The charging device as claimed in claim 1, wherein the sloping surface is mounted on a housing of the metering chamber in a vertically movable manner, and wherein the mounting is at a distance from a coupling of the vibrator and is effected in particular via elastic blocks.

17. The charging device as claimed in claim 16, wherein the inclination of the sloping surface is adaptable via an adjusting device.

18. The charging device as claimed in claim 1, wherein the metering chambers can be vibrated via the vibrator, and wherein a connecting beam is formed under a base of the metering chambers, said connecting beam extending over a plurality of metering chambers and making the introduction of force into the vibrator more uniform.

19. A method of operating the charging device for tubular reactors of claim 1, which runs a plurality of metering chambers which can be filled with carrier material, comprising filling the metering chambers with carrier material utilizing a vibrator vibrating a sloping surface at the base of the metering chambers during charging, wherein a gap is formed between the sloping surface and an opposing surface, and this gap at least partly holds back the carrier material and in particular singulates it.

20. The method as claimed in claim 19, wherein the gap can be adjusted in its width in relation to the filling material, and wherein the opposing surface absorbs essentially half the weight of the filling material received in the metering chamber.

21. The method as claimed in claim 19, wherein a discharge lip on an outlet side of the metering chamber allows the filling material to slide out of the metering chamber and is charged at a layer height of the filling material which is less than 10 cm.

* * * * *